United States Patent

[11] 3,629,562

[72] Inventors Frederick B. Davis, 3rd
Drexel Hill;
Charles W. Ross, Hatboro, both of Pa.
[21] Appl. No. 879,646
[22] Filed Nov. 25, 1969
[45] Patented Dec. 21, 1971
[73] Assignee Leeds & Northrup Company
Philadelphia, Pa.

[54] CONTROL FOR POWER POOLS
6 Claims, 2 Drawing Figs.

[52] U.S. Cl. .................................................. 235/151.21,
307/29, 307/31
[51] Int. Cl. .................................................. G06f 15/56,
G06g 7/62
[50] Field of Search .................................. 235/151.21,
151.2, 150.5; 307/29, 31–35

[56] References Cited
UNITED STATES PATENTS

| | | | |
|---|---|---|---|
| 2,836,731 | 5/1958 | Miller, Jr. | 235/151.21 X |
| 3,117,221 | 1/1964 | Kirchmayer | 235/151.21 UX |
| 3,270,209 | 8/1966 | Cohn | 235/151.21 X |
| 3,392,272 | 7/1968 | Stadlin | 235/151.21 |
| 3,400,258 | 9/1968 | Stadlin | 235/151.21 |

Primary Examiner—Eugene G. Botz
Assistant Examiner—Jerry Smith
Attorneys—William G. Miller, Jr. and Raymond F. MacKay ABSTRACT: The load of a pool is distributed among the units of its interconnected areas by allocating load to the areas in accordance with signals received from each area representative of the generation change capability of the units in that area.

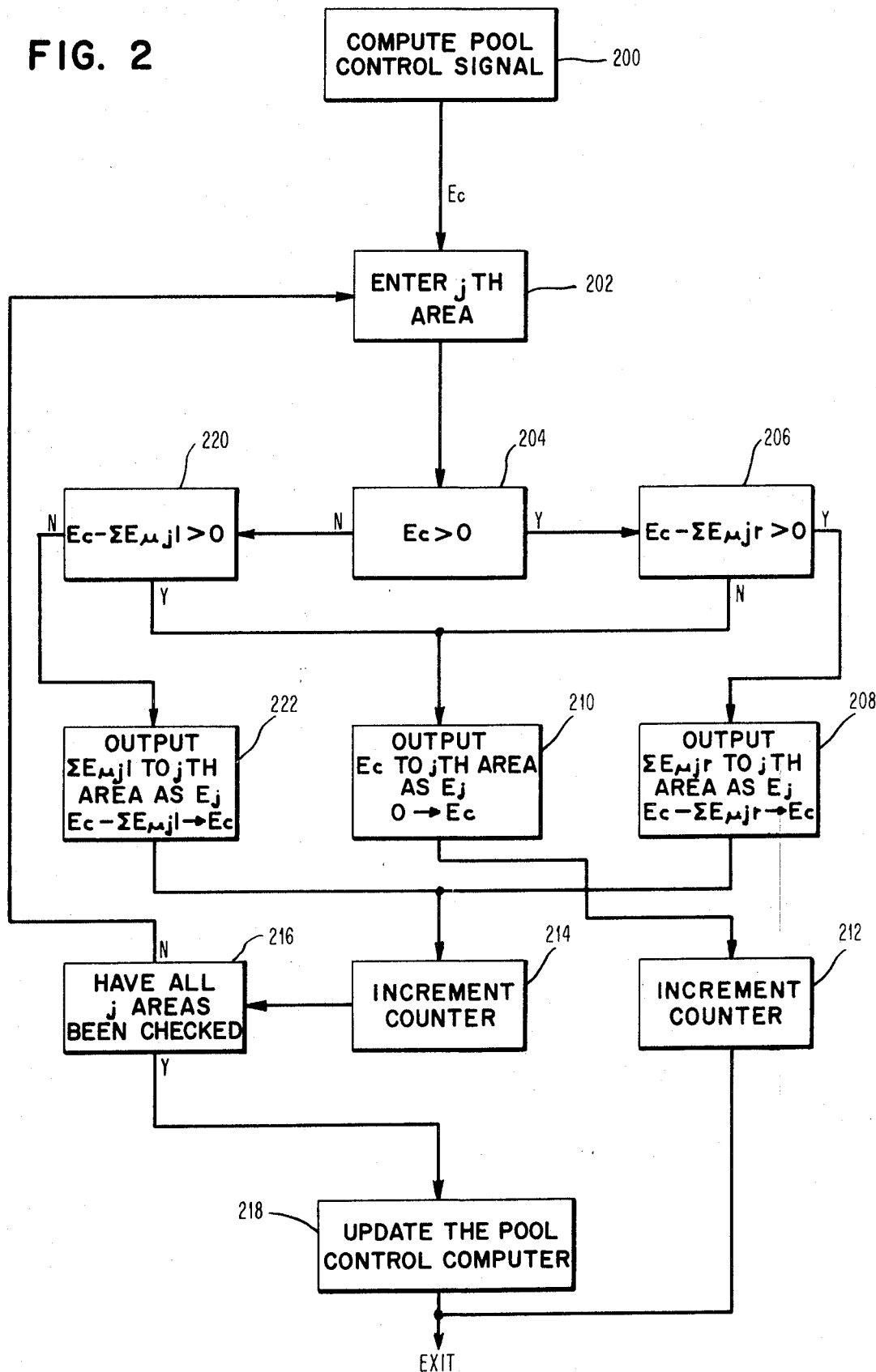

3,629,562

CONTROL FOR POWER POOLS

BACKGROUND OF THE INVENTION

This invention relates to a means and method for the control of the allocation of generation between a plurality of power generation units grouped into distribution areas which are interconnected to form a power pool for the purpose of sharing the load assumed by the interconnected areas with the sharing being carried out in accordance with a particular predetermined criteria, such as for economic allocation of the load amongst the units. More particularly, this invention relates to a new and novel method and means for controlling the generation of the units of the separate interconnected areas so as to maintain a substantially constant overall gain for the control action which is executed.

In the past, the control of the units of the separate areas interconnected to form a power pool has usually been executed in response to a common control signal (a "raise" signal or a "lower" signal) sent to all of the units of the pool capable of changing their generation in the direction called for and required to change their generation in that direction to tend to achieve economic distribution of the load. With such an arrangement the overall gain of the control varied depending upon the number of units which were directed to accept the control signals and the capacity of those particular units. Thus, in some cases the response to the control signal would be greater than the response at other times when a different number of units or units having a different capacity were accepting control signals. Exemplary of the type of power pool control system which is representative of the prior art devices and which has the disadvantages which are overcome by this invention is the system sown in U.S. Pat. No. 3,400,258, which issued to W. O. Stadlin on Sept. 3, 1968.

SUMMARY OF THE INVENTION

In carrying out the present invention there is provided a method and means for controlling a plurality of power generation units grouped into distribution areas which are themselves interconnected to form a pool for sharing the load assumed by the interconnection in accordance with the established economic allocation among the units or in accordance with any other predetermined criteria. There is produced a first signal established from measurements which are indicative of the load carried by the interconnection. Those first signals represent the total change in generation required in the pool during a subsequent period of control in order to meet the assumed load of the interconnection. For each area there is produced a second signal which is representative of the generation change which that area can effect during the subsequent period in the direction called for by the first signal. The required change in generation to be allocated to each of the areas during the subsequent control period is then determined in accordance with the magnitude of the respective second signals. The generation of each of the areas is then changed in accordance with the allocation of the total change required for the pool.

It is therefor an object of this invention to provide a pool control system in which the gain of the control effected in the areas making up the pool remains substantially constant regardless of the number or capacity of the units under control at any particular time.

It is further an object of this invention to provide a means for allocating the control of the units making up the several different interconnected areas of a power pool so that the control is effected by utilizing the capability of each of the units of a particular area for control in the desired direction while utilizing the capability of the units of any other area for control in that same direction only to the extent that the control effect allocated will not exceed the control effect required to provide the appropriate control of the power pool in accordance with the predetermined criteria for loading the units of the pool.

BRIEF DESCRIPTION OF THE DRAWING

FIG. 2 is a flow chart showing the algorithm which can be used for programming the digital part of the system of FIG. 1 to make the necessary computations and effect the necessary control required in the system of FIG. 1.

DESCRIPTION OF THE PREFERRED EMBODIMENT

Figure 1:
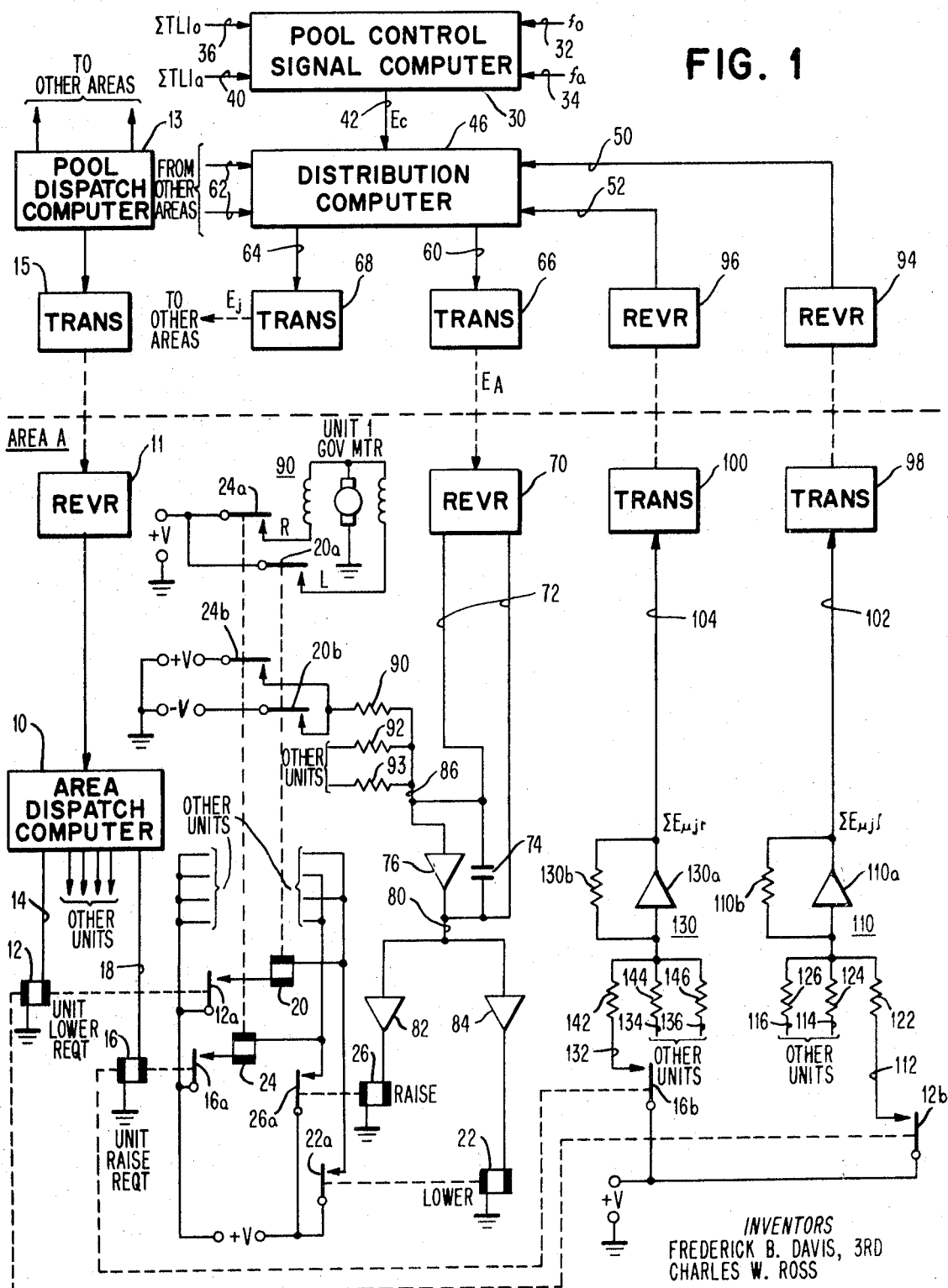
FIG. 1 is a diagrammatic showing of a power-pool control system partially in block diagram form.

For the purposes of this description it may be assumed that the allocation of generation among the several units which make up each of the areas interconnected to form the power pool under control is carried out in any of a number of well-known ways. For example, it may be carried out in accordance with the arrangement shown in FIG. 2 of U.S. Pat. No. 3,400,258 issued to W. O. Stadlin on Sept. 3, 1968, wherein the economic division of the total load assumed by the pool is established by first determining the applicable incremental cost of power at the buses of the interconnected areas and then by determining from those incremental cost figures for the area buses similar incremental cost figures for the station buses, where the units of the area are grouped in stations which are in turn interconnected to form an area. The incremental cost at the station bus is then used to determine the required unit generation for effecting an economic distribution of the total pool load among the units. That calculation can incorporate not only the fuel costs but also the incremental transmission losses expected on the lines interconnecting the stations of the area as well as those interconnecting the areas of the pool.

For the purpose of determining which units are to have their generation changed in response to a requirement for generation change for the pool as a whole, it is necessary to compare the desired generation as calculated by the economic allocation computation with the actual generation of the corresponding unit so as to determine the unit requirement, or in other words, the required change in generation for each particular unit to meet the economic allocation computed. The system of U.S. Pat. No. 3,400,258 shows in detail one method for computing the unit requirement for each unit. The present FIG. 1 shows a similar system in less detail in that it shows the use of an Area Dispatch Computer 10 which receives its input via telemetering receiver 11 from the Pool Dispatch Computer 13 and its telemetering transmitter 15. Computer 10 determines whether or not there exists a lower requirement for the particular unit or a raise requirement for that unit. This determination can be made by the method described in U.S. Pat. No. 3,400,258. Whenever a lower requirement exists, the relay operator 12 is energized by way of line 14; whereas when the computer 10 determines that a raise requirements exits for the particular unit, the relay operator 16 is energized through line 18.

If, for example, the relay operator 12 is energized, relay contact 12a will be closed and the relay operator 20 will be energized from the +V supply when the contact 22a closed by the energization of relay operator 22 when a lowering of the generation in the area under control is called for by the pool control computations. Similarly, the energization of relay operator 16 to close the relay contacts 16a will cause an energization of relay operator 24 if the relay contact 26a is closed as a result of energization of relay operator 26 indicating the existence of a raise requirement for the units of the area under control of Area Dispatch Computer 10.

While only the details regarding the control of unit 1 of an area A are shown, it will be understood that the computer 10 would supply signals to the other units of area A, and each area would have its own area dispatch computer receiving signals from the Pool Dispatch Computer 13.

It will be evident that the system of FIG. 1 can take the place of the pulse generator 184 of U.S. Pat. No. 3,400,258 and its associated lines for carrying the raise and lower pulses to relays 200 and 210.

In the present FIG. 1 the Pool Control Signal Computer 30, which would normally be a digital computer, is shown as receiving a signal $f_0$ on line 32 representative of the set frequency for the pool, such as 60 Hz. and a signal $f_a$ on line 34 representative of the measured actual frequency of the pool. The computer 30 also receives a signal on line 36 representative of the desired net tieline interchange $\Sigma TLI_0$ between the pool and any other pool to which it may be connected, the desired net tieline interchange is the algebraic sum of the individual tieline interchange values set for each of the ties. There is also provided on line 40 to computer 30 a signal representative of the net measured tieline interchange $\Sigma TLI_a$ for the pool.

Utilizing the information provided by the signals on lines 32, 34, 36 and 40, during each input period of the cycle of digital computer 30, the computer will, by means of its control algorithm, determine after each input period the value $E_c$ for the total change in generation required during the subsequent control period, and that computed value will be represented by a signal supplied on line 42 to the digital Distribution Computer 46. The computer 30 can operate in accordance with a well-known algorithm such as the algorithm used for obtaining $\epsilon_c$ in FIG. 4a of our U.S. Pat. No. 3,525,857. Thus $E_c$ in the present FIG. 1 can be calculated in accordance with the following equation:

$$E_c = k_p[(ACE)_n - (ACE)_{n-1}] + K_R(ACE)_n$$

where:

$K_p$ = proportional gain,
$K_R$ = reset gain,
$ACE = (\Sigma TLI_a - TLI_0) - 10B(f_a - f_0)$ and:

$B$ = bias setting in megawatts per one-tenth hertz.

The equation for the Area Control Error $ACE$ is similar to that for Area Requirement as set forth on pg. 17–40 in the Handbook of Automation, Computation and Control, Vol. 3, published by John Wiley in 1961, for $ACE$ is the same quantity as Area requirement but with a different sign. Computer 46 functions to compare the total desired change in generation $E_c$ with the raise or lower capability of each of each of the areas interconnected to form the pool so as to allocate to each of those areas individual control signals of a raise or lower sense calling for and amount of control which the particular area is capable of providing. For this purpose there is supplied to Distribution Computer 46 on line 50 a signal representative of the total capability of units of area A to decrease generation. Likewise, there is supplied on line 52 a signal representative of the total capability of the units of area A to increase generation.

The Distribution Computer, by utilizing the algorithm shown in FIG. 2 and described more completely in subsequent paragraphs, compares the total required change in generation $E_c$ with the individual total capabilities of the units of the separate areas to change generation in the sense called for by $E_c$ and from that comparison determines the amount of generation change to be allocated to each area. For example, in FIG. 1 area A is allocated a generation change amounting to $E_A$ as represented by the signal on line 60, whereas the other areas of the total number of areas J in the pool are allocated a different amount of generation change as determined by the signals supplied on lines such as lines 62 from the other areas and the amount determined for a particular area $j$ is then allocated by means of the signal on a line such as 64.

Both the signals on lines 60 and 64 are inputs to the respective telemetering transmitters 66 and 68 which then telemeter their respective signals $E_A$ and $E_j$ to area A and to the $j$th area. The telemetered signal to area A is received by the receiver 70. The receiver 70 then, at the particular time that the control period is to start, produces an output on lines 72 which is effective to charge capacitor 74 to a potential corresponding with the signal $E_A$. As will be noted from FIG. 1, the capacitor 74 is in the feedback path of operational amplifier 76, and as a result there is produced online 80 a signal of polarity indicative of the direction of change in generation required in area A and a magnitude indicative of the magnitude of the generation change required in area A. When the signal on line 80 is of such polarity as to indicate a raise requirement for area A, then the relay actuator 26 will be energized by way of relay amplifier 82. Similarly, if the signal on line 80 is of a different polarity indicating a lower requirement, then relay actuator 22 will be energized by relay amplifier 84. The respective relays 26 and 22 will be energized until the signal on line 80 has been reduced to zero as by changing the input on line 86 to amplifier 76 until the charge on capacitor 74, as established by the receiver 70, has been removed.

The input on line 86 is determined by the current flow in the input resistors 90, 92 and 93. The resistor 90 may, for example, have a value as compared with the value of the resistors 92 and 93 which is proportional to the reciprocal of the expected response of unit 1 as compared with the other units of area A to the control signals sent to the unit governor motors such as 90 in either a raise or lower sense as by the closing of the contacts 24a or 20a, respectively. Thus, with the closing of the contacts 24a or 20a, respectively. Thus, with the closing of contact 24b current flow through resistor 90 will be produced by the potential $+V$ and the charge on the capacitor 74 will be decreased proportionally as long as the relay actuator 24 is energized.

The closure of the contact 20b by relay actuator 20 will cause a current flow in resistor 90 of an opposite direction to that caused by the closure of contact 24b as a result of the $-V$ power supply connected in series with the contact 20b. This opposite direction of current flow through resistor 90 would, of course, occur only when the relay operator 20 is energized as a result of a lower requirement being computed by Area Dispatch Computer 10 at the same time as a lower requirement is sent to area A from the Distribution Computer 46 by signal $E_A$. Thus, it will be seen that the capacitor 74 will be charged to have one polarity when the required generation change for the area calls for an increase in generation and it will have another polarity when the required generation change for the area is for a lowering of the generation.

The resistors 92 and 93 would be connected to circuitry associated with other units of area A and there would be similar additional resistors in the input path for amplifier 76 for each of the additional units in the area.

Regardless of the direction of the generation change required of the area to meet the generation change requirements of the pool, each of the units which has a unit requirement of similar sense will receive control signals to its governor motor until the charge on capacitor 74 has been reduced to zero.

As will be evident from FIG. 1, the signals sent to the Distribution Computer 46 on line 50 and 52 are received from area A by the telemeter receivers 94 and 96, respectively, and those signals are transmitted by the corresponding telemetering transmitters 98 and 100 so that the signal on line 50 will correspond with the signal at the area level on line 102 and the signal on line 52 will correspond with the signal on line 104.

The signal on line 102, representing the total capability of the area A to lower its generation, is established by a summation in summing amplifier 110 of the inputs from lines 112, 114, and 116. The summing amplifier 110 comprises operational amplifier 110a and the feedback resistor 110b as well as the input resistors 122, 124 and 126.

As is evident from FIG. 1, as long as the relay operator 12 is energized the relay contact 12b is closed to connect the source $+V$ and provide a current through line 112 and input resistor 122 of amplifier 110. Similarly, the current through lines 114 and 116 representing other units of the area will be controlled by similar relay operators such as relay operator 12 so that the summation of the currents by the summing amplifier 110 will be effective to produce on line 102 a signal $\Sigma E_{wj}$ representative of the total capability of area A to lower generation. The resistors 122, 124 and 126 are proportioned in their values in accordance with the reciprocal of the expected unit response of the associated units just as resistors 90, 92, and 93 are proportioned.

Similarly, the signal on line 104 representing the total raise capability of the units of area A is obtained from a summing amplifier 130 similar to amplifier 110 in that it has a feedback resistor 130b and receives an input on line 132 for unit 1 (upon closure of contact 16b) as well as an input on line 134 and line 136 for other units of the area so that by virtue of the respective values of input resistors 142, 144 and 146, the currents on lines 132, 134 and 136 sum to provide a signal on line 104 representative of the total capability of the units of area A to lower generation.

In summary, the pool control system of FIG. 1 utilizes a Pool Control Signal Computer 30 to determine, in accordance with its control algorithm and in accordance with the set values of frequency and tieline interchange as well as the measured values of frequency and tieline interchange, a signal representing the total generation change required in the pool to meet the allocated load for the pool during a control period. The total generation change requirement $E_c$ is essentially divided by the distribution computer 46 among the areas of the pool in accordance with their individual capability of providing a change in generation in the direction represented by the signal $E_c$. Thus, the signal $E_c$ is sequentially decremented by the signal from either line 50 or 52 as well as the signals on lines 62 depending on the sense of the signal $E_c$, so that the Distribution Computer 46 can sequentially assign to the individual areas of the pool a required change in generation such as represented by the signal $E_A$ for area A and $E_j$ for each of the other areas which have a corresponding control capability. When generation change is allocated to area A as by the appearance of the signal $E_A$ over the telemetering lines to receiver 70, there is a resulting charge placed on capacitor 74 and an appropriate energization of either the raise relay 26 or the lower relay 22 so as to enable the energization of the unit raise relay 24 or the unit lower relay 20 if the Area Dispatch Computer 10 has energized a corresponding relay operator 16 or 12. Thus, for example, if a raise requirement is called for by the signal $E_A$, relay operator 26 will be energized, and if the computer 10 has computed that a unit raise requirement exists for unit 1, then relay actuator 16 will be energized. The resulting closure of the corresponding contacts 26a and 16a causes the relay actuator 24 to be energized from the power supply +V and as a result there will be a closure of the contacts 24a and 24b. The closing of contact 24a causes the governor motor 90 to increase the output of the generator unit 1. At the same time, the closure of contact 24b causes the charge on capacitor 74 to be decreased in proportion to the expected change in generation to be effected by unit 1. Thus, unit 1 and any other units which have a raise requirement will change the generation of area A until the charge on capacitor 74 has been decreased to zero.

It will be evident that the computations made by computer 10 may advantageously occur before the computations made by computers 30 and 46 to establish the signal $E_A$ so that the existence of a unit raise requirement for unit 1 of area A as indicated the energization of relay actuator 16 will cause current to flow on line 132 so as to contribute to the magnitude of the signal on line 104 and likewise the signal on line 52. Thus, the signal on line 52 is available to the Distribution Computer 46 prior to the determination of the magnitudes of signal $E_c$ on line 42, and the Distribution Computer 46 can allocate the total required change in generation among the several interconnected areas in accordance with the capabilities of each of the areas to change its generation in the direction called for by the signal $E_c$.

By assigning generation change only in accordance with the capability of the particular units of each area to accomplish that change, there is effectively maintained a constant gain of the control of the areas so that for a particular generation change requirement a comparable generation change can be expected in the same period of time regardless of the number of units under control or the particular capacity of those units.

In FIG. 2 there is shown an algorithm representing one of the possible procedures which can be followed by the program for the digital computer 46 to perform the functions described for computer 46. Initially, the computer 30 computes the pool control signal $E_c$ as indicated by block 200. Block 202 calls for the sequential entry into the respective areas, that is it calls for the computer to establish the necessary logic and communications making the calculation for a particular area and sending the control signal to that area after its magnitude has been calculated.

As indicated by block 204, the total required change in generation $E_c$ is compared with zero, and if it is greater than zero, the comparison shown in block 206 is made; namely, $E_c$ is compared with $\Sigma E_{ujr}$, which is the total capability of the units of area $j$ to increase generation.

If $E_c$ is greater than the total raise capability of the units of area $j$, then the procedure called for in block 208 is carried out; namely, a signal representative of $\Sigma E_{ujr}$ is outputted to the $j$th area as the signal $E_j$ and $E_c$ is compared with $\Sigma E_{ujr}$ with the difference being sent to storage as the new $E_c$.

Referring back to the comparison made in block 206, if $E_c$ was found not to be greater than $\Sigma E_{ujr}$, then the procedure set forth in block 210 would be followed; namely, a signal of the magnitude $E_c$ would be outputted to the $j$th area as $E_j$ and a zero would be entered in the storage location for the new $E_c$ since all of the required generation change would have been allocated. In such a situation, the next step would be that shown in block 212; namely, to increment the counter so as to cause the computer to enter the next area whenever the program is run again. After incrementing the counter, the program is exited.

Referring back to the procedure set forth in block 208, it will be noted from FIG. 2 that the next step would likewise be an incrementing of the counter as set forth in block 214 after which there would be an interrogation as set forth in block 216 to determine whether all $j$ areas have been checked. If they have not all been checked, then the program returns to block 202 and the next area is entered as determined by the incrementing of the counter. If, on the other hand, all of the $j$ areas have been checked, the next step would be to update the Pool Control Computer as set forth in block 218. Such an updating would consist of taking any remaining unallocated generation change which is required and using it in the next computation to be made for the required generation change by the computer 30 of FIG. 1 as represented by block 200 in FIG. 2. For example, if the control algorithm utilized in block 200 includes proportional action, any remaining unallocated generation change called for would be taken into account in order not to lose the proportional action required. Such a calculation would not be necessary if only reset action were involved in the computation in block 200, for the remaining unallocated generation change could be discarded without affecting the control action in subsequent control periods.

In the event that the signal $E_c$ is less than zero as a result of the decision made in block 204, or in other words, if $E_c$ is negative, then the comparison called for in block 220 is made; namely, $E_c$ is compared with $\Sigma E_{ujl}$ which represents the total capability of the units of the $j$th area to decreased generation. If the comparison made in block 220 indicates that $E_c$ is greater than $\Sigma E_{ujl}$, then the next action to be taken is that shown in block 210, as previously described. Otherwise, the action to be taken is that shown in block 222, namely, outputting of a signal $E_j$ to the $j$th area of magnitude corresponding with $\Sigma E_{ujl}$ and also a comparison of $E_c$ and $\Sigma E_{ujl}$ with the difference being sent to memory as the new value for $E_c$ after which the counter is incremented as indicated in block 214.

It will be evident to those skilled in the art that systems other than that described above may be used to control the load distribution in a pool on the basis of the capability of each of the areas to respond to control signals so as to maintain the gain of the control substantially constant. It is understood that the embodiment described is by way of example only, and that the invention is not limited to that embodiment but is limited only by the scope of the claims.

What is claimed is:

1. A method for controlling a plurality of power generation units grouped into distribution areas which are interconnected to form a pool for sharing the load assumed by the interconnected areas in accordance with a predetermined criteria, comprising the steps of
    producing from measurements indicative of the assumed load a first signal representing the total change in generation required in the pool during a subsequent period of control to meet said assumed load,
    producing for each area a second signal representative of the generation change which that area can effect in a particular direction during the subsequent period,
    allocating to the individual areas said total change required in the pool in accordance with the magnitude of the respective second signals, and
    changing the generation of each of the areas in accordance with the allocation of said total change.

2. A method for controlling a plurality of power generation units grouped into distribution areas which are interconnected to form a pool for sharing the load assumed by the interconnected areas in accordance with a predetermined criteria, comprising the steps of
    periodically producing from measurements indicative of the assumed load a first signal representing the total change in generation required in the pool during a subsequent period of control to meet said assumed load,
    producing for each area second and third signals respectively representative of the generation change which that area can effect in a raise and lower direction during the subsequent period,
    allocating to the individual areas said total change required in the pool in accordance with the magnitude of the respective second and third signals, and
    changing the generation of each of the areas in accordance with the allocation of said total change.

3. A method for controlling a plurality of power generation units grouped into distribution areas which are interconnected to form a pool for sharing the load assumed by the interconnected areas in accordance with a predetermined criteria, comprising the steps of
    periodically producing from measurements indicative of the assumed load a first signal representing the total change in generation required in the pool during a subsequent period of control to meet said assumed load,
    producing for each area a second signal representative of the generation change which that area can effect in a particular direction during the subsequent period,
    determining that portion of the required change in generation to be allocated to each of the areas during the subsequent control period by sequentially decrementing said first signal by amounts corresponding with the values of said second signals until said first signal has been decremented to zero or until allocations have been made to each of said areas, and
    changing the generation of each of the areas in accordance with the value of the corresponding second signals used to decrement said first signal.

4. A method for controlling a plurality of power generation units grouped into distribution areas which are interconnected to form a pool for sharing the load assumed by the interconnected areas in accordance with a predetermined criteria, comprising the steps of
    periodically producing from measurements indicative of the assumed load a first signal representing the total change in generation required in the pool during a subsequent period of control to meet said assumed load,
    producing for each area second and third signals respectively representative of the generation change which that area can effect in a raise and lower direction during the subsequent period,
    determining that portion of the required change in generation to be allocated to each of the areas during the subsequent control period by sequentially decrementing said first signal by amounts corresponding with the value of said second and third signals for required changes in raise and lower directions, respectively, until said first signal has been decremented to zero or until allocations have been made to each of said areas, and
    changing the generation of each of the areas in accordance with the value of the corresponding second or third signals used to decrement said first signal.

5. A method of control as set forth in claim 4 in which the second and third signal are produced at each of the respective areas and are transmitted to the location at which the first signal is produced.

6. A method for controlling a plurality of power generation units grouped into distribution areas which are interconnected to from a pool for sharing the load assumed by the interconnected areas in accordance with a predetermined criteria, comprising the steps of
    periodically producing from measurements indicative of the assumed load a first signal representing the total change in generation required in the pool during a subsequent period of control to meet said assumed load,
    producing for each area second and third signals respectively representative of the generation change which that area can effect in a raise and lower direction during the subsequent period,
    producing for each area a fourth signal representative of the required change in generation to be made during the subsequent control period, said fourth signals being determined by sequentially subtracting said second or third signals for each area from said first signal depending on whether said first signal calls for a raise or a lower requirement for the pool, and
    changing the generation of those units in each area which require a change in the direction called for by the first signal until the unit requirements are met.

* * * * *

PO-1050
(5/69)

UNITED STATES PATENT OFFICE
CERTIFICATE OF CORRECTION

Patent No. __3,629,562__    Dated __December 21, 1971__

Inventor(s) __Frederick B. Davis, 3rd & Charles W. Ross__

It is certified that error appears in the above-identified patent and that said Letters Patent are hereby corrected as shown below:

Column 1, Line 33, "sown" should read --shown--.

Column 2, Line 47, "lower" should read --"lower"--.
Column 2, Line 48, "raise" should read --"raise"--.
Column 2, Line 50, "lower" should read --"lower"--.
Column 2, Line 52, "raise" should read --"raise"--.
Column 2, Line 52, "requirements" should read --requirement--.
Column 2, Line 57, "22a closed" should read --22a is closed--.
Column 2, Line 65, "raise" should read --"raise"--.
Column 2, Line 74, "raise" should read --"raise"--.
Column 2, Line 74, "lower" should read --"lower"--.

Column 3, Line 26, that portion of equation reading "$E_c = k_p$" should read --$E_c = K_p$--.
Column 3, Line 30, that portion of equation reading "$(\Sigma TLI_a - TLI_0)$" should read --$(\Sigma TLI_a - \Sigma TLI_0)$--.

Column 3, Line 40, "raise" should read --"raise"--.
Column 3, Line 40, "lower" should read --"lower"--.
Column 3, Line 42, "raise" should read --"raise"--.
Column 3, Line 42, "lower" should read --"lower"--.
Column 3, Line 43, "and" should read --an--.
Column 3, Line 73, "online" should read --on line--.

Column 4, Line 2, "raise" should read --"raise"--.
Column 4, Line 5, "lower" should read --"lower"--.
Column 4, Line 17, "raise" should read --"raise"--.
Column 4, Line 17, "lower" should read --"lower"--.
Column 4, Line 19, Delete "the contacts 24a or 20a, respectively. Thus, with the closing of"
Column 4, Line 31, "lower" should read --"lower"--.
Column 4, Line 32, "lower" should read --"lower"--.

UNITED STATES PATENT OFFICE
CERTIFICATE OF CORRECTION

Patent No. 3,629,562      Dated December 21, 1971

Inventor(s)    Frederick B. Davis et al.     PAGE - 2

It is certified that error appears in the above-identified patent and that said Letters Patent are hereby corrected as shown below:

Column 5, Line 1, "raise" should read --"raise"--.
Column 5, Line 33, "raise" should read --"raise"--.
Column 5, Line 34, "lower" should read --"lower"--.
Column 5, Line 35, "raise" should read --"raise"--.
Column 5, Line 35, "lower" should read --"lower"--.
Column 5, Line 37, "raise" should read --"raise"--.
Column 5, Line 39, "raise" should read --"raise"--.
Column 5, Line 49, "raise" should read --"raise"--.
Column 5, Line 55, "raise" should read --"raise"--.

Column 8, Line 34, "from" should read --form--.

Signed and sealed this 18th day of July 1972.

(SEAL)
Attest:

EDWARD M. FLETCHER, JR.            ROBERT GOTTSCHALK
Attesting Officer                 Commissioner of Patents